United States Patent
Mathieu et al.

(10) Patent No.: US 7,198,423 B2
(45) Date of Patent: Apr. 3, 2007

(54) SKIRTING DUCT ANGLE ACCESSORY COMPRISING TWO FLAPS ASSEMBLED TOGETHER AT AN ANGLE

(75) Inventors: Tristan Mathieu, Dijon (FR); Patrice Jarry, Mont Saint Jean (FR)

(73) Assignees: Legrand France, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 10/981,599

(22) Filed: Nov. 5, 2004

(65) Prior Publication Data
US 2005/0111909 A1    May 26, 2005

(30) Foreign Application Priority Data
Nov. 5, 2003    (FR) ................... 03 12988

(51) Int. Cl.
*F16B 7/10*    (2006.01)
*F16C 11/00*    (2006.01)
*F16D 1/12*    (2006.01)

(52) U.S. Cl. ................... 403/52; 403/64; 52/656.9; 174/95; 174/71 R; 174/72 R

(58) Field of Classification Search ................ 403/52, 403/64, 65, 169, 389, 393; 237/79; 52/656.9; 174/48, 49, 95, 71 R, 72 R; 285/131, 424
See application file for complete search history.

(56) References Cited

U.S. PATENT DOCUMENTS

| | | | | |
|---|---|---|---|---|
| 1,804,954 A | * | 5/1931 | Rutherford | ................... 285/181 |
| 2,656,999 A | * | 10/1953 | Ullberg, Jr. | ................. 248/68.1 |
| 5,230,552 A | * | 7/1993 | Schipper et al. | ......... 312/223.6 |
| 5,332,866 A | * | 7/1994 | Sawamura | ................... 174/101 |
| 5,917,982 A | * | 6/1999 | Vargas et al. | ................ 385/134 |
| 6,002,087 A | * | 12/1999 | Albert et al. | .................. 174/48 |
| 6,323,421 B1 | * | 11/2001 | Pawson et al. | ................ 174/48 |
| 6,444,903 B2 | * | 9/2002 | Saeki et al. | ................... 174/48 |
| 6,478,499 B1 | * | 11/2002 | Fugman et al. | ............... 403/82 |
| 6,805,514 B2 | * | 10/2004 | Buard | ........................ 403/402 |

FOREIGN PATENT DOCUMENTS

| EP | 0 823 762 | 2/1998 |
|---|---|---|
| EP | 1 207 604 | 5/2002 |

* cited by examiner

Primary Examiner—Daniel P. Stodola
Assistant Examiner—Nahid Amiri
(74) Attorney, Agent, or Firm—Young & Thompson

(57) ABSTRACT

An angle accessory for skirting ducts includes two flaps mounted to pivot about a pivot axis via assembly structure including two male engagement elements on the first flap and two female engagement elements on the second flap. In the vicinity of the male engagement elements, the first flap has at least one flange projecting from one of its end edges and forming an obstacle that co-operates with at least one lip of the first flap to define at least one passageway giving access to at least one male engagement element, the passageway having a small height constraining the flaps to be assembled together by bringing the second flap towards the first flap while tilting the second flap relative to the first flap's pivot axis, and then by straightening up the second flap along the pivot axis so as to engage successively the female engagement elements over the male engagement elements.

18 Claims, 3 Drawing Sheets

SKIRTING DUCT ANGLE ACCESSORY COMPRISING TWO FLAPS ASSEMBLED TOGETHER AT AN ANGLE

The present invention relates generally to skirting ducts of the type implemented, for example, for supporting, housing and protecting conductors, pipes, or other infrastructure necessary for serving equipment.

More particularly, the present invention relates to an angle accessory serving to establish continuity between two skirting duct segments running along two walls that are at an angle to each other, said angle accessory comprising two distinct flaps provided with assembly means that co-operate to allow said flaps to pivot about a pivot axis, said assembly means comprising firstly, at one end of lips of the first flap, two male engagement elements extending along the pivot axis, and, secondly at one end of lips of the second flap, two female engagement elements designed to receive said male engagement elements.

BACKGROUND OF THE INVENTION

An angle accessory of that type is already known, in particular from Document IT 01281834. In that angle accessory, a flap has facing lugs at one end of its lips, those lugs carrying studs designed to be inserted into openings provided in the lips of the other flap.

The flaps are assembled together by pinching together slightly the lips of the flap carrying said openings so as to deform said lips elastically and so as to engage said openings over said studs.

Thus, said flaps can take up different relative angular positions between a first end position in which the flap carrying the studs uncovers the other flap to as large an extent as possible in order to form an angle less than or equal to 90°, and a second end position in which the flap carrying the studs is fully folded over onto the other flap to form an angle greater than 90°.

In addition, in that document, each of said lugs carrying the studs of the corresponding flap has a circular edge provided with a bevel which, when said flap is in the second end position fully folded over onto the other flap, serves to co-operate with a recessed wedge provided in the vicinity of the opening, on the outside surface of the lip of the corresponding flap. In said second position, that co-operation between the bevels and the wedges acts when an impact occurs on said flaps to prevent said studs from disengaging from said openings, and thus to prevent said flaps from coming apart.

The major drawback of the above-mentioned angle accessory is that, apart from the bevel and wedge arrangement, it has no means for acting, when said flaps are in relative angular positions other than said above-mentioned end position, to prevent impacts on said flaps from causing the studs to disengage from said openings and thus from causing said flaps to come apart.

OBJECTS AND SUMMARY OF THE INVENTION

In order to remedy that drawback of the state of the art, the present invention provides an accessory as defined in the introduction and which includes means for preventing impacts on said flaps from causing said flaps to come apart regardless of their relative in-use position.

More particularly, in the angle accessory of the invention, in the vicinity of said male engagement elements, the first flap is provided with at least one flange projecting from one of its end edges and forming an obstacle that co-operates with at least one lip of said first flap to define at least one passageway giving access to at least one male engagement element, said passageway having a small height constraining said flaps to be assembled together by bringing the second flap towards the first flap while tilting said second flap relative to said pivot axis of the first flap, and then by straightening up said second flap along the pivot axis so as to engage successively one of said female engagement elements over the corresponding male engagement element and then the other of said female engagement elements over the corresponding other male engagement element.

Other non-limiting and advantageous characteristics of the accessory of the invention are as follows:

- said flange is a single flange and it extends over the majority of the height of the corresponding flap;
- each flange has a curved profile;
- each flange is inclined relative to the pivot axis defined by said male engagement means;
- one of said male engagement elements has a slope serving to co-operate with a bevel provided on the corresponding female engagement element in order to assist in assembling together said male and female engagement elements;
- said male engagement elements are studs which project from the inside face of said first flap;
- said female engagement elements are openings provided in mutually facing lugs which project from the ends of the corresponding lips of said second flap;
- each flange is formed integrally with said first flap which is made of a molded plastics material;
- said male engagement elements are formed integrally with said first flap which is made of a molded plastics material; and
- said female engagement elements are formed integrally with said second flap which is made of a molded plastics material.

BRIEF DESCRIPTION OF THE DRAWINGS

What the invention consists of and how it can be implemented are clearly understood from the following description given with reference to the accompanying drawings which are given as non-limiting examples.

In the accompanying drawings.

MORE DETAILED DESCRIPTION

Figure 4:
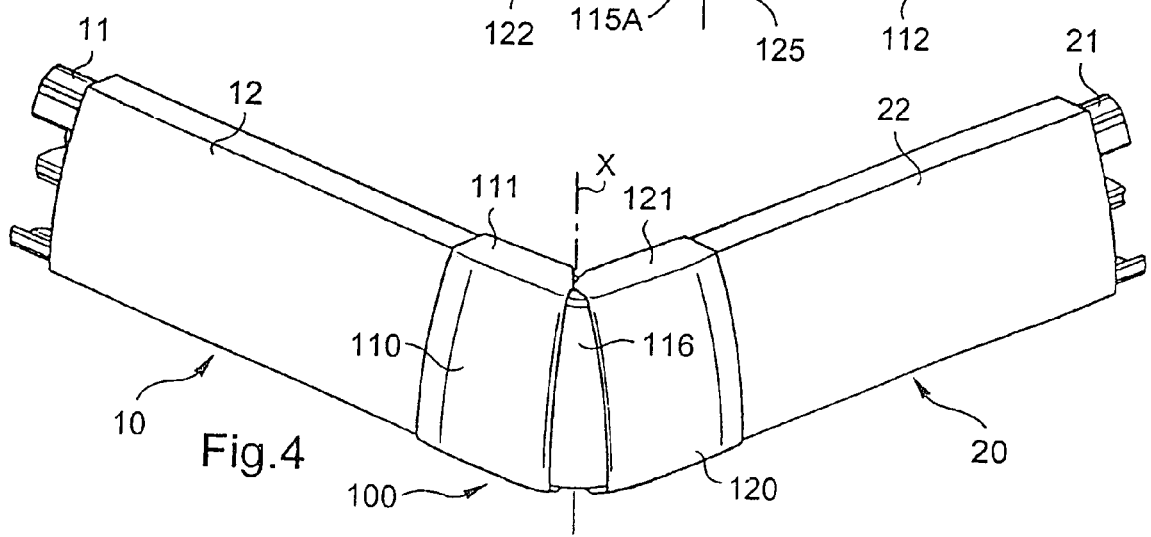
FIG. 4 is a diagrammatic perspective view of the outside of the angle accessory of the invention as disposed at the junction between two skirting ducts extending at an angle to each other.

FIG. 4 shows an angle accessory 100 of the invention to be disposed at the junction between two skirting ducts 10, 20 extending at an angle to each other.

In this example, the angle accessory 100 is particularly well suited to connecting together two skirting ducts 10, 20 forming, in practice, a right angle between them.

Considering two walls that form a projecting angle between them, the supports 11, 21 of the two skirting ducts 10, 20 are disposed flush against respective ones of the two walls, e.g. by running in the manner of a skirting board at the base of said wall.

The ends of the supports 11, 21 of the skirting ducts 10, 20 are cut such that they are substantially touching at their webs, and they are positioned edge-to-edge in substantially touching manner so as to form substantially the projecting angle that is formed between the supporting walls.

In this example, the supports 11, 21 of the skirting ducts 10, 20 are substantially channel-section with each of them having two side flanges flanking a web. In addition, the support 11, 21 of each skirting duct 10, 20 carries a partition which extends perpendicular to its web for the purpose of separating the space inside said support into two mutually isolated compartments.

Each support 11, 21 of each skirting duct 10, 20 is closed by a cover 12, 22 which is adapted to be mounted by snap-fastening onto the side flanges of said support 11, 21. In this example, the covers 12, 22 are said to be "wrap-around" because they wrap around onto the outside face Of said side flanges.

The angle accessory 100 is a mask that locally replaces the cover 12, 22 of each of the skirting ducts, preferably by covering the corresponding cut end of said cover (see FIG. 4).

The angle accessory is made up of two distinct flaps 110, 120.

Each flap 110, 120 has a profile similar to the profile of the covers 12, 22 of the skirting ducts 10, 20, with a cheek flanked on opposite sides with lips 111, 112, 121, 122 extending facing each other and substantially at right angles to said cheek.

As shown more particularly in FIGS. 1A, 1C, 2A, and 2C, the lips 111, 112, 121, 122 of each flap 110, 120 are provided with securing means 113, 123 on the inside face 110A, 120A of the cheek, which securing means are suitable for holding the flap 110, 120 relative to the skirting ducts 10, 20.

In this example, the securing means are snap-fastening teeth 113, 123 suitable for snap-fastening onto snap-fastening beads (not visible in FIG. 4) situated on the outside faces of said side flanges of the supports 11, 21 of said skirting ducts 10, 20.

The snap-fastening teeth 113, 123 do not extend over the entire length of said lips 111, 112, 121, 122 so that each flap 110, 120 has an end portion (constituted by a portion of the cheek and by a portion of each of the lips of the flap) referred to as the "outer end portion" (situated on the right of FIG. 1A for the first flap 110 and on the left in FIG. 2A for the second flap 120) adapted to cover a cut end portion of the corresponding skirting duct cover 12, 22.

Advantageously, where the snap-fastening teeth 113, 123 meet said outer end portion, each flap 110, 120 has a rib or abutment on its inside face 110A, 120A, which abutment extends over the cheek of the flap 110, 120 and serves as a reference for positioning each flap 110, 120 on each skirting duct cover 12, 22 by coming into abutment against the cut edge of the corresponding cover 12, 22.

In addition, the flaps 110, 120 of the angle accessory 100 are provided with mutual assembly means which co-operate to allow said flaps 110, 120 to pivot about a pivot axis X.

Figure 1A:
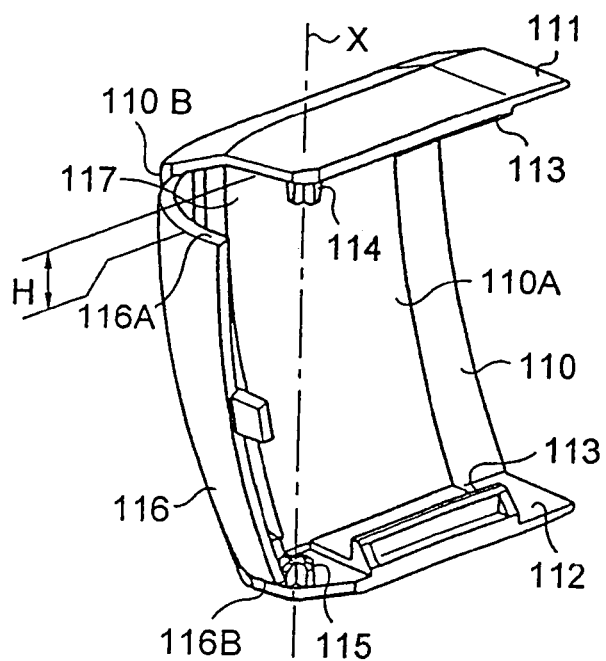
FIG. 1A is a diagrammatic perspective view of the inside of a first flap of the angle accessory of the invention.
Figure 1B:
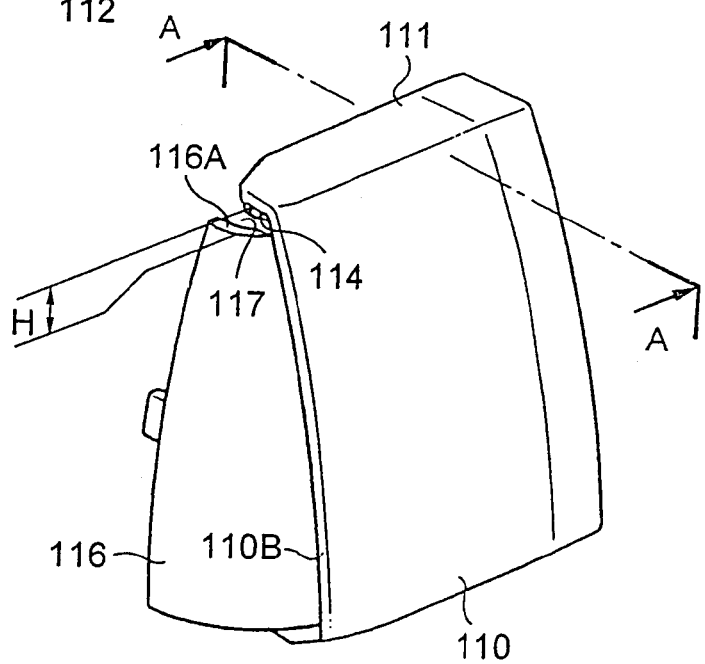
FIG. 1B is a diagrammatic perspective view of the outside of the first flap of FIG. 1A.
Figure 1C:
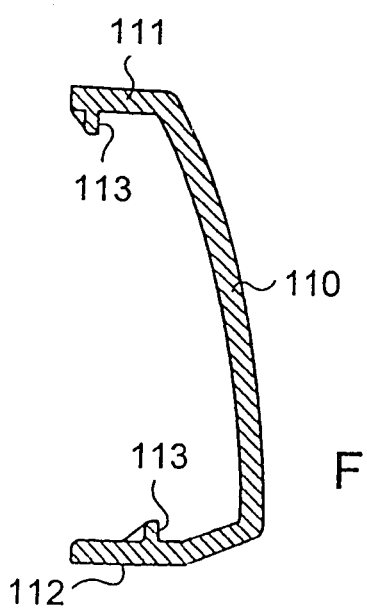
FIG. 1C is a section view on plane A—A of the first flap of FIG. 1B.
Figure 2A:
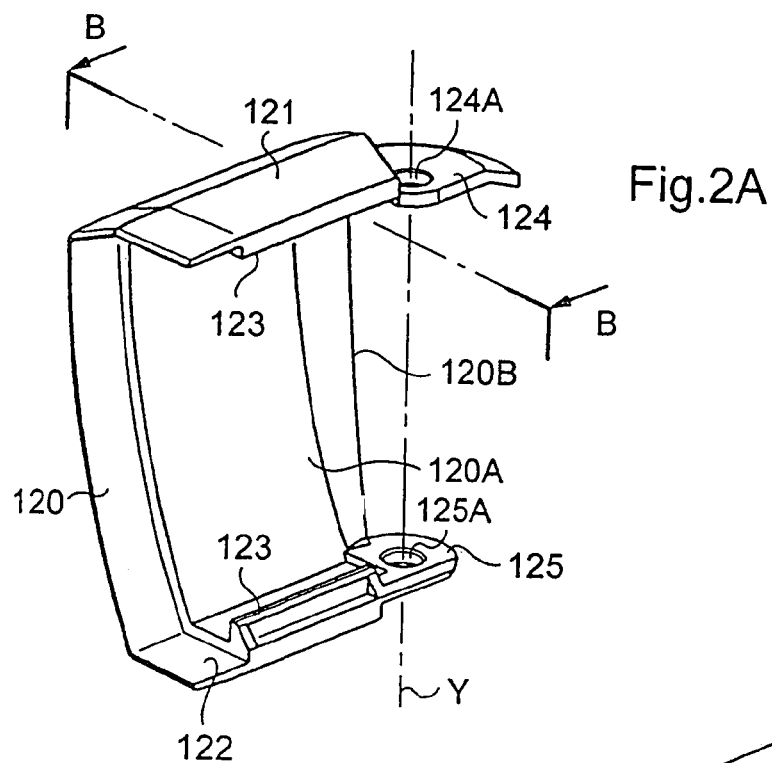
FIG. 2A is a diagrammatic perspective view of the inside of a second flap of the angle accessory of the invention.
Figure 2B:
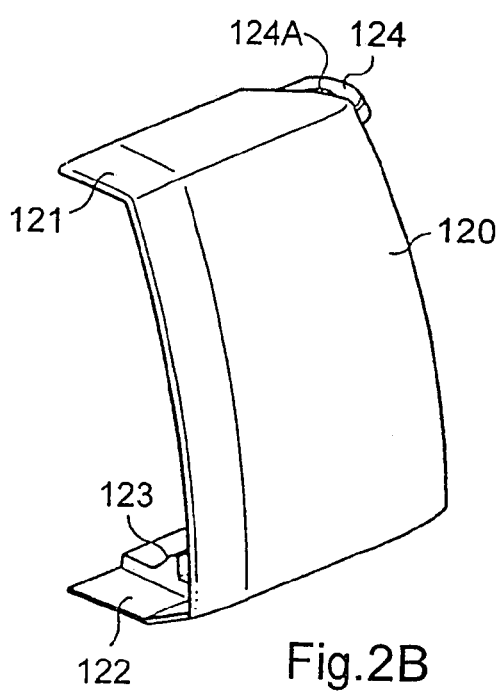
FIG. 2B is a diagrammatic perspective view of the outside of the second flap of FIG. 2A.
Figure 2C:
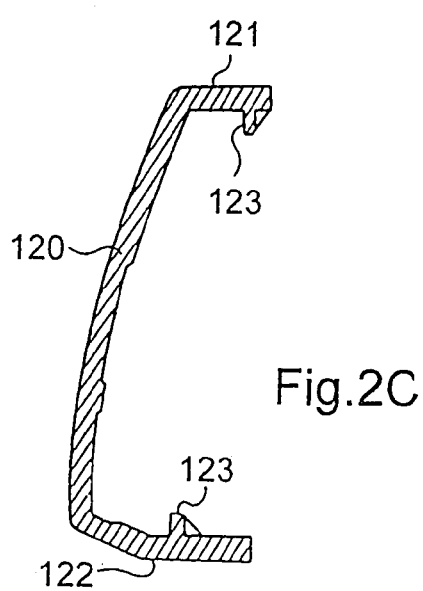
FIG. 2C is a section view on plane B—B of the second flap of FIG. 2A.

The assembly means comprise firstly, at one end of the lips 111, 112 of the first flap 110, two male engagement elements 114, 115 extending along the pivot axis X (see FIGS. 1A, 1B) and secondly, at one end of the lips 121, 122 of the second flap 120, two female engagement elements 124, 124A, 125, 125A designed to receive said male engagement elements 114, 115 (see FIGS. 2A and 2B).

As shown in FIG. 1A, the two male engagement elements 114, 115 are situated at the "inner" end (situated on the left in FIG. 1A) of the lips 111, 112 of the first flap 110, i.e. opposite from said outer end adapted to cover an end portion of a skirting duct cover 12.

As shown in FIG. 2A, the two female engagement elements 124, 124A, 125, 125A are situated at the "inner" end (situated on the right of FIG. 2A) of the lips 121, 122 of the second flap 120, i.e. opposite from said outer end adapted to cover an end portion of a skirting duct cover 22.

In this example, said male engagement elements are studs 114, 115 which project from the inside face 110A of said first flap 110. Said studs 114, 115 face each other and define the pivot axis X (see FIG. 1A).

Said female engagement elements are openings 124A, 125A provided in mutually facing lugs 124, 125 that project from the corresponding end edge 120B of said second flap 120. In this example, said openings 124A, 125A are circular, they are placed facing each other and they thus have the same axis Y (see FIG. 2A).

Advantageously, in the invention, and as shown in FIGS. 1A and 1B, in the vicinity of said male engagement elements 114, 115, the first flap 110 carries at least one flange 116 projecting from one of its end edges 110B, which flange forms an obstacle co-operating with at least one lip 111, 112 of said first flap 110 to define at least one passageway 117 giving access to at least one male engagement element 114, said passageway 117 having a small height H constraining said flaps 110, 120 to be assembled together by tilting the second flap 120 relative to said pivot axis X of the first flap 110 while bringing said second flap towards the first flap (see FIG. 3A), and then by straightening up said second flap 120 along the pivot axis X (see FIG. 3B) so as to engage one of said female engagement elements 124, 124A over the corresponding male element 114 and then, successively, the other of said female engagement elements 125, 125A over the corresponding other male element 115.

In this example, the flange 116 is a single flange and it extends over the majority of the height of the first flap 110.

Said single flange 116 then defines two passageways, namely one for each lug 124, 125 of the second flap 120.

Figure 3A:
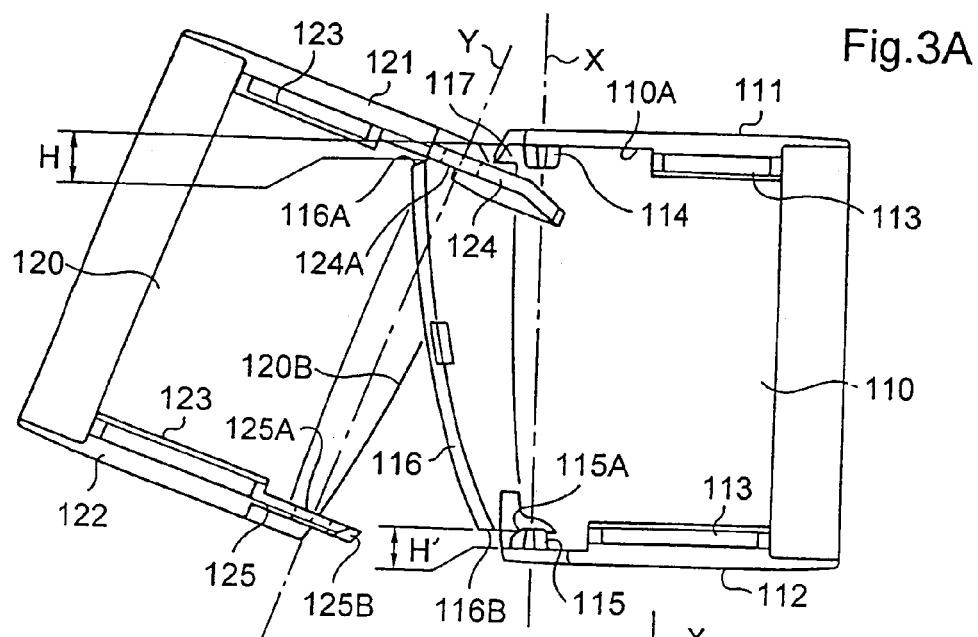
FIG. 3A is a diagrammatic face view of the insides of the first and second flaps of FIGS. 1A and 2A while they are being assembled together.

In particular, as shown in FIG. 3A, a first passageway 117 of small height H is defined between the top edge 116A of said flange 116 and the lip 111 of the first flap 110, and a second passageway of small height H' is defined between the bottom edge 116B of said flange 116 and the lip 112 of the first flap 110.

The first passageway 117 or "top passageway" makes it possible for the opening 124A provided in the lug 124 of the second flap 120 to gain access to the stud 114 of the first flap 110, and the second passageway (not referenced in FIG. 3A) or "bottom" passageway makes it possible for the opening 125A provided in the lug 125 of the second flap 120 to gain access to the stud 115 of the first flap 110.

The height of these passageways 117 lies approximately in the range 1 millimeter (mm) to 6 mm, for example, and preferably in the range 1 mm to 3 mm.

Said flange 116 preferably has a curved profile and is inclined slightly relative to the pivot axis X defined by said male engagement means 114, 115. When the two flaps 110, 120 are assembled together, the flange 116 establishes the junction between them by closing the angle formed by the skirting duct supports 11, 21.

Advantageously, said flange 116 is formed integrally with the first flap 110 which is made of a molded plastics material.

Figure 3B:
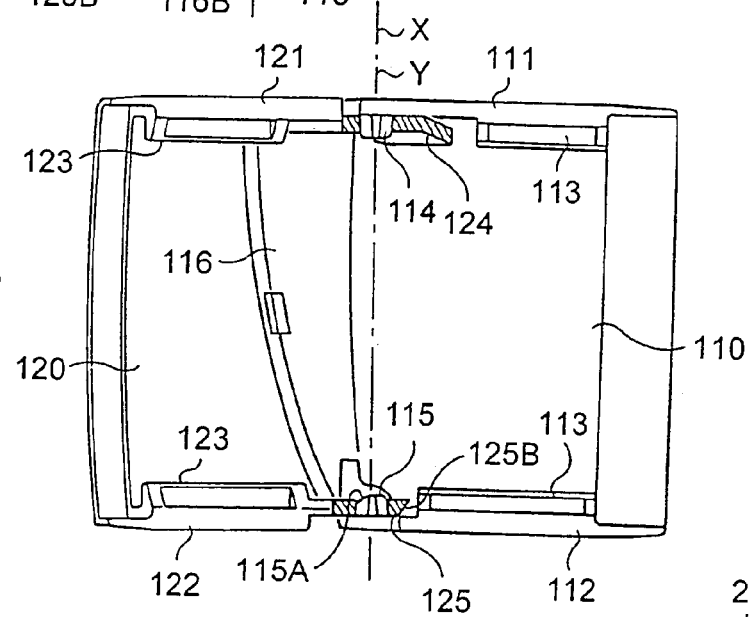
FIG. 3B is a diagrammatic face view of the insides of the first and second flaps of FIGS. 1A and 2A as assembled together.

In addition, preferably, one of the male engagement elements (the stud 115) has a slope 115A serving to co-operate with a bevel 125B provided on the corresponding female engagement element, i.e. on the edge of the lug 125, in order to assist in assembling together said male and female engagement elements (see FIGS. 3A and 3B).

In this example too, said male engagement elements 114, 115 and said female engagement elements 124, 124A, 125, 125A are formed integrally respectively with said first flap 110 and with said second flap 120, which flaps are made of a molded plastics material.

More generally, each flap 110, 120 of the angle accessory 100 of the invention is one-piece part preferably made of a molded plastics material.

Thus, as shown in FIGS. 3A and 3B, in order to assemble together the two flaps 110, 120, it is necessary to bring the second flap 120 towards the first flap 110 with its axis Y inclined relative to the pivot axis X in order to insert the top lug 124 of said second flap 120 into said passageway 117 defined between the flange 116 and the lip 111 of the first flap 110 so that said opening 124A comes to face the corresponding stud 114.

Then, the second flap 120 is straightened up along the pivot axis X so as firstly to engage said opening 124A over said stud 114, and then to insert the bottom lug 125 into the corresponding passageway defined between the flange 116 and the lip 112 of the first flap 110, so that said opening 125A engages over the corresponding stud 115. Engaging the opening 125A over the stud 115 is facilitated by sliding the bevel 125B of the lug 125 over the slope 115A of said stud 115 which helps said lug 125 to pass over said stud 115.

Conversely, it is also possible firstly to engage the opening 124A over the stud 115, and then, secondly, to engage the opening 124A over the stud 114, by proceeding symmetrically.

An impact occurring on said angle accessory 100 cannot then cause the two flaps 110, 120 to come apart regardless of the relative angular position of said flaps 110, 120 because it easy to understand that, even when a relatively violent impact occurs, said second flap 120 cannot, by itself, pivot backwards to disengage from its pivoting co-operation with said first flap 110.

In particular, the opening 124A in the top lug 124 can under no circumstances disengage from its co-operation with the stud 114 because said lug 124 would naturally come into abutment against the flange 116.

The present invention is in no way limited to the embodiment described and shown, but rather the person skilled in the art can make any variant to it that lies within its spirit.

What is claimed is:

1. An angle accessory serving to establish continuity between two skirting duct segments running along two walls that are at an angle to each other, said angle accessory comprising two distinct flaps provided with assembly means that co-operate to allow said flaps to pivot about a pivot axis in order to take different angular positions one to each other, said assembly means comprising firstly, at one end of lips of a first flap, two male engagement elements extending along the pivot axis, and, secondly at one end of lips of a second flap, two female engagement elements with a same axis and designed to receive said male engagement elements, wherein, in the vicinity of said male engagement elements, the first flap is provided with at least one flange projecting from one of its end edges and forming an obstacle before at least one of said male engagement elements, said flange having two opposed free edges, namely a top edge and a bottom edge, separate from said lips, one of said top and bottom edges delimiting with one end edge of at least one lip of said first flap one passageway through which goes one of said female engagement elements to access to said male engagement elements, said passageway having a small height constraining said flaps to be assembled together by bringing the second flap towards the first flap with said axis of said female engagement elements of said second flap inclined relative to said pivot axis of the first flap in order to insert said female engagement elements into said passageway defined between said flange and a corresponding lip, and then by pivoting said second flap for straightening up one of said axis of said female engagement elements along the pivot axis so as to engage successively said female engagement element over a corresponding male engagement element and then one of the other female engagement elements over a corresponding one of the other male engagement elements.

2. An angle accessory according to claim 1, wherein said flange is a single flange and it extends over the majority of the height of the corresponding flap.

3. An angle accessory according to claim 1, wherein said flange has a curved profile.

4. An angle accessory according to claim 1, wherein said flange is inclined relative to the pivot axis defined by said male engagement elements.

5. An angle accessory according to claim 1, wherein one of said male engagement elements has a slope serving to co-operate with a bevel provided on the corresponding female engagement element in order to assist in assembling together said male and female engagement elements.

6. An angle accessory according to claim 1, wherein said male engagement elements are studs which project from the inside face of said first flap.

7. An angle accessory according to claim 1, wherein said female engagement elements are openings provided in mutually facing lugs which project from the ends of the lips of said second flap.

8. An angle accessory according to claim 1, wherein said flange is formed integrally with said first flap which is made of a molded plastics material.

9. An angle accessory according to claim 1, wherein said male engagement elements are formed integrally with said first flap which is made of a molded plastics material.

10. An angle accessory according to claim 1, wherein said female engagement elements are formed integrally with said second flap which is made of a molded plastics material.

11. An angle accessory serving to establish continuity between two skirting duct segments running along two walls that are at an angle to each other, said angle accessory comprising two distinct flaps provided with assembly means that co-operate to allow said flaps to pivot about a pivot axis, said assembly means comprising firstly, at one end of lips of a first flap, two male engagement elements extending along the pivot axis, and, secondly at one end of lips of a second flap, two female engagement elements designed to receive said male engagement elements, wherein, in the vicinity of said male engagement elements, the first flap is provided with at least one flange projecting from one of its end edges and forming an obstacle that co-operates with at least one of the lips of said first flap to define at least one passageway giving access to at least one of the male engagement elements, said passageway having a small height constraining said flaps to be assembled together by bringing the second flap towards the first flap while tilting said second flap relative to said pivot axis of the first flap, and then by straightening up said second flap along the pivot axis so as to engage successively one of said female engagement elements over a corresponding male engagement element and then the other of said female engagement elements over the corresponding other one of the male engagement elements, wherein one of said male engagement elements has a slope serving to co-operate with a bevel provided on a corresponding female engagement element in order to assist in assembling together said male and female engagement elements.

12. An angle accessory according to claim 11, wherein said flange is a single flange and it extends over the majority of the height of the corresponding flap.

13. An angle accessory according to claim 11, wherein said flange has a curved profile.

14. An angle accessory according to claim 11, wherein said flange is inclined relative to the pivot axis defined by said male engagement elements.

15. An angle accessory serving to establish continuity between two skirting duct segments running along two walls that are at an angle to each other, said angle accessory comprising two distinct flaps provided with assembly means that co-operate to allow said flaps to pivot about a pivot axis, said assembly means comprising firstly, at one end of lips of a first flap, two male engagement elements extending along the pivot axis, and, secondly at one end of lips of a second flap, two female engagement elements designed to receive said male engagement elements, wherein, in the vicinity of said male engagement elements, the first flap is provided with at least one flange projecting from one of its end edges and forming an obstacle that co-operates with at least one of the lips of said first flap to define at least one passageway giving access to at least one of the male engagement elements, said passageway having a small height constraining said flaps to be assembled together by bringing the second flap towards the first flap while tilting said second flap relative to said pivot axis of the first flap, and then by straightening up said second flap along the pivot axis so as to engage successively one of said female engagement elements over a corresponding male engagement element and then the other of said female engagement elements over the corresponding other one of the male engagement elements, wherein said female engagement elements are openings provided in mutually facing lugs which project from the ends of the a lips of said second flap.

16. An angle accessory according to claim 15, wherein said flange is formed integrally with said first flap which is made of a molded plastics material.

17. An angle accessory according to claim 15, wherein said male engagement elements are formed integrally with said first flap which is made of a molded plastics material.

18. An angle accessory according to claim 15, wherein said female engagement elements are formed integrally with said second flap which is made of a molded plastics material.

* * * * *